June 11, 1946.  A. A. KAHIL  2,401,830
FABRIC AND METHOD OF MAKING THE SAME
Filed April 28, 1945  2 Sheets-Sheet 1

INVENTOR.
Abraham A. Kahil
BY
Benj. T. Rauber
ATTORNEY

June 11, 1946.   A. A. KAHIL   2,401,830
FABRIC AND METHOD OF MAKING THE SAME
Filed April 28, 1945   2 Sheets-Sheet 2

INVENTOR.
Abraham A. Kahil
BY
ATTORNEY

Patented June 11, 1946

2,401,830

UNITED STATES PATENT OFFICE 2,401,830

FABRIC AND METHOD OF MAKING THE SAME

Abraham A. Kahil, Ridgefield, N. J.

Application April 28, 1945, Serial No. 590,789

14 Claims. (Cl. 28—77)

My present invention relates to a fabric having two or more plies stitched together at spaced intervals, the outer or facing ply or plies being of closely woven non-shrinkable material, and the inner ply or plies being of a material shrunk, after the plies have been united, in such manner as to cause the facing ply or plies to pucker or crinkle.

In the fabric of my invention, for example, there may be a single base or underlying ply of shrinkable material and a single outer or facing ply overlying the base ply and stitched thereto at intervals as, for example, by longitudinal stitching at regularly or irregularly spaced intervals, by spaced cross-stitching, or by stitching in a figured design or in diagonal or crisscross formations.

The two or more plies are attached securely at the points or lines of stitching and consequently when the under or base ply or plies are shrunk or contracted the spaces of the facing fabric between the stitchings are crinkled or puckered. The effect or appearance may be similar to that which would be obtained if the two plies were interwoven at the points or lines of stitching.

Two facing fabrics may be used on opposite sides of a single inner or base layer or fabric, and when the assembly is then stitched in spaced lines and the under ply shrunk a crinkle is obtained on both sides. The crinkling effect may be combined with a base fabric structure in such a manner as to provide a large number of small air pockets to provide a fabric of increased heat insulating qualities, the facing fabrics in this case serving to prevent penetration by the wind, while the inner or base fabric may have the heat insulating qualities of wool increased by the added pocketing of air. In this way a number of alternate plies may be used as, for example, two facing fabrics, two shrinkable base fabrics and an intermediate closely woven fabric between the two shrinkable fabrics, the crinkling of this intermediate closely woven fabric serving to increase the thickness and the number of air pockets without increasing proportionately the weight.

The facing fabric may be of any substantially non-shrinkable material as, for example, cotton, silk, rayon, nylon, or mixtures of them. Shrinking of these fabrics may take place to some extent, but to obtain the crinkled or puckered effect any such shrinking must be small in comparison with that of the underlying or base ply.

The underlying or base ply may be of any suitable shrinkable material. It may be a loosely woven woolen fabric shrunk by fulling after stitching. It may be a fabric or mat of matted or slightly felted wool fibers which upon fulling, after being stitched to the facing fabric, shrinks to give the puckered or crinkled effect or it may be a wadding wholly or partially of woolen fibers.

In case shrinking is to take place by fulling the base or underlying fabric or wadding need not be of pure woolen fibers but may be of wool admixed with cotton or other natural fibers or with fibers of "Airlac" or other synthetic fibers.

The base or underlying fabric may be a loosely woven fabric in which the warp or weft or both are of supertwisted yarns or threads held straight by sizing during weaving and being stitched to the facing fabric and which twist and double and thereby shorten when the sizing is later washed out. The effect is similar to that of shrinking a woolen fabric by fulling except that the shrinkage in the yarns or threads manifests itself by localized curling or twisting of the thread on itself.

When heat insulation is a primary consideration the base or intermediate fabric may be woven or knitted or cut in such a manner as to provide a maximum of air pockets. For example the underlying fabric may for this purpose be made of an uneven or knobbed or nubby wool or thread in which parts stand up from the surface so as to effect a deeper or thicker fabric, obtaining a proportionately increased amount of entrapped air.

The various features of the invention are illustrated, by way of example, in the accompanying drawings in which Fig. 1 is a face view of a three-ply fabric embodying the construction of my present invention prior to the shrinking of the base or intermediate fabric, certain portions of the ply being torn away to show the interior construction;

Referring more particularly to Figs. 1-4 of the drawings the fabric therein illustrated comprises two facing plies 10 and 11 of closely woven relatively non-shrinkable material and a shrinkable base ply 12. These plies are stitched together by longitudinal stitchings 13 at spaced intervals and transverse stitchings 14 at similarly spaced intervals.

Figure 1:
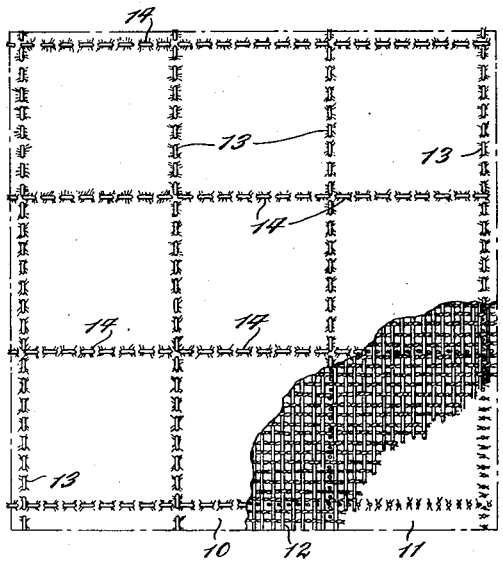
Figure 2:
Fig. 2 is a face view of the fabric after the base ply has been shrunk and the surface or face plies have thereby been crinkled.
Figure 3:
Fig. 3 is a cross section on a greatly magnified scale of the fabric shown in Fig. 1.
Figure 4:
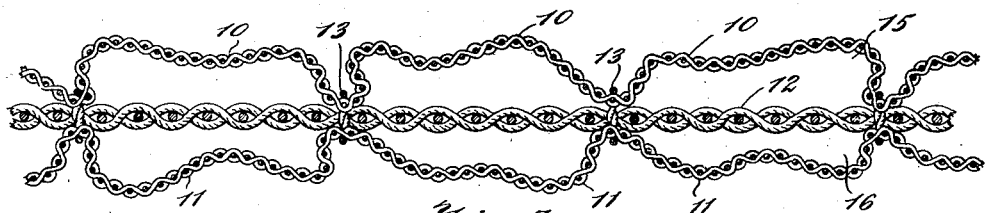
Fig. 4 is a cross section on a greatly magnified scale of the fabric shown in Fig. 2.

As shown in Fig. 3 the base ply 12 is relatively loosely woven. When shrunk as, for example, by fulling in the case of a woolen ply the yarn or threads of the ply shrink and this ply becomes more closely woven, as shown in Fig. 4, thus drawing together between the stitchings 13 and 14 and contracting the areas between the stitchings. This causes the facing plies 10 and 11 to pucker or crinkle, puffing out to some extent. This gives the fancy or ornamental effect shown in Fig. 2. Also by increasing the thickness of the fabric and enclosing air spaces or pockets, as indicated at 15 and 16 in Fig. 4, the heat insulating qualities of the fabric are increased.

Figure 5:
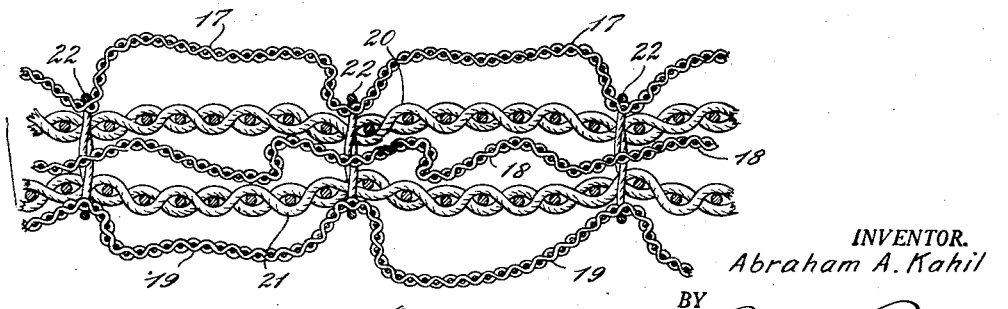
Fig. 5 is a cross section on a greatly magnified scale of a five-ply fabric embodying the invention.

If further heat insulation is desired, the number of plies may be increased as illustrated in Fig. 5. In this illustration there are three relatively closely woven plies 17, 18 and 19. Between the plies 17 and 18 there is a base or intermediate ply 20 of fulled or shrunken threads or fiber and between the plies 18 and 19 there is a similar shrunken or fulled ply 21. These plies are all united by stitching 22 at spaced intervals. The fulling or shrinking of the base plies taking place after the stitching of the plies.

It will be apparent that the crinkling of the plies 17, 18 and 19 fluffs out the fabric giving it an increased apparent thickness and forming a larger number of separate air pockets between the various plies.

It will be understood that the number of plies may thus be increased with the result that a fabric of greatly increased heat insulating qualities may be obtained with a relatively small increase in weight.

Figure 6:
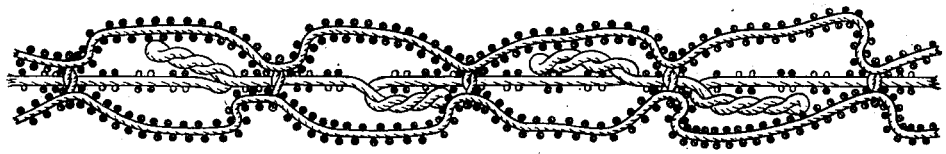
Fig. 6 is a cross section similar to that of Fig. 4 of a fabric in which the base or intermediate ply is made of super twisted thread or yarn in which the shrinkage is obtained by washing out the sizing.

In the example shown in Fig. 6 two facing plies 23 and 24 enclose a shrunk ply 25 in the same manner as illustrated in Fig. 4. In this case, however, instead of using threads or yarns which shrink by a drawing together and shifting of the fibers, as in the fulling of a woolen strand, the shrinking is obtained by using overly twisted threads or yarns 26 which are held straight or kept from twisting upon themselves by being filled with a water soluble size. However after the ply has been woven and united by stitching with the facing ply and the size then washed from the threads the super twisting of the threads causes them to twist upon each other, as shown at 27, thus shortening the lengths of the threads at intervals and giving the effect of shrinking. The protuberances at 27 also tend to provide increased air pockets.

Figure 7:
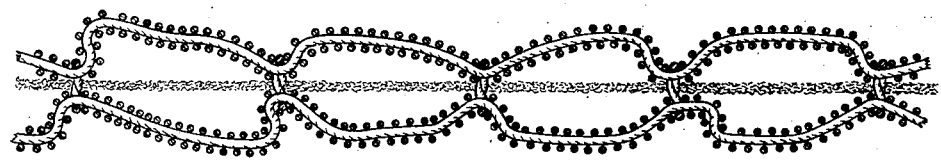
Fig. 7 is a cross section similar to that of Figs. 4 and 6 of a fabric in which the base or inner ply is of a knitted, mat or felt construction.

In the modification shown in Fig. 7 an intermediate or base ply 28 enclosed between facing plies 29 and 30 is a knitted, bat or loose felting of wool fibers or of admixed wool and other fibers. When this bat is stitched between the facing fabrics and then fulled it shrinks uniformly forming a thicker, stronger felted structure and also drawing the facing fabrics into the puckered or crinkled shape.

Through the above invention a great variety and flexibility in the formation and production of crinkled faced fabrics is obtained. No set weaving is required either for the base fabric or the facing fabrics.

Inasmuch as the base fabric is not exposed to wear or to view, cheaper constructions may be employed without impairing proportionately the quality of the fabrics. Since the fact that the threads of the base or contracted ply do not appear at any point on the surface or face fabrics the latter may be given a more uniform appearance.

What I claim is:

1. A composite fabric which comprises a shrunk under fabric, a closely woven non-shrinking facing fabric and stitching at spaced intervals uniting said fabrics, said facing fabric being crinkled between said stitchings.

2. A composite fabric which comprises a shrunk fulled woolen under fabric, a closely woven non-shrinking facing fabric and stitching at spaced intervals uniting said fabrics, said facing fabric being crinkled between said stitchings.

3. The fabric of claim 2 in which said under fabric is a woven fabric.

4. The fabric of claim 2 in which said under fabric is a felted fabric having woolen fibers.

5. A composite fabric which comprises an under fabric of overtwisted yarn in which the yarn is contracted by twisting upon itself, a closely woven facing fabric and stitching at spaced intervals uniting said fabrics, said fabrics being crinkled between said stitchings.

6. A composite fabric which comprises a pair of closely woven non-shrinking facing fabrics, a shrunk inner fabric and stitching at spaced intervals uniting said fabrics, said facing fabrics being crinkled between said stitchings.

7. A composite fabric which comprises alternate layers of closely woven non-shrinking crinkled fabric and shrunk fabrics, said fabrics being stitched together at spaced intervals.

8. A method of making composite fabric which comprises stitching together at spaced intervals a closely woven non-shrinking facing fabric and a shrinkable base fabric and permanently contracting said base fabric to crinkle said facing fabric between said stitchings.

9. A method of making composite fabric which comprises stitching together at spaced intervals a closely woven non-shrinking facing fabric and a shrinkable base fabric comprising loosely woven woolen yarns and permanently contracting said base fabric to crinkle said facing fabric between said stitchings.

10. A method of making composite fabric which comprises stitching together at spaced intervals a closely woven fabric and a shrinkable base fabric comprising supertwisted yarns held straight by sizing and washing said sizing from said base fabric after said stitching to permit said yarns to twist upon themselves and contract and crinkle said facing fabric between said stitchings.

11. A method of making composite fabric which comprises placing a bat comprising wool fibers between a pair of closely woven relatively non-shrinkable facing fabrics, stitching said facing fabrics and bat together at spaced intervals and fulling said fabric to contract said bat and to crinkle said facing fabrics between said stitchings.

12. A method of making composite fabric which comprises superposing alternately closely woven relatively non-shrinkable fabrics and shrinkable fabrics, stitching said fabrics together at spaced intervals and shrinking the shrinkable fabrics to cause the closely woven fabrics to crinkle between said stitchings.

13. The fabric of claim 2 in which said under fabric is a wadding having woolen fibers.

14. The fabric of claim 2 in which said under fabric is a knitted fabric having woolen fibers.

ABRAHAM A. KAHIL.